R. K. Hawley,
Hanging Saws.
Nº 25,411.    Patented Sep. 13, 1859.
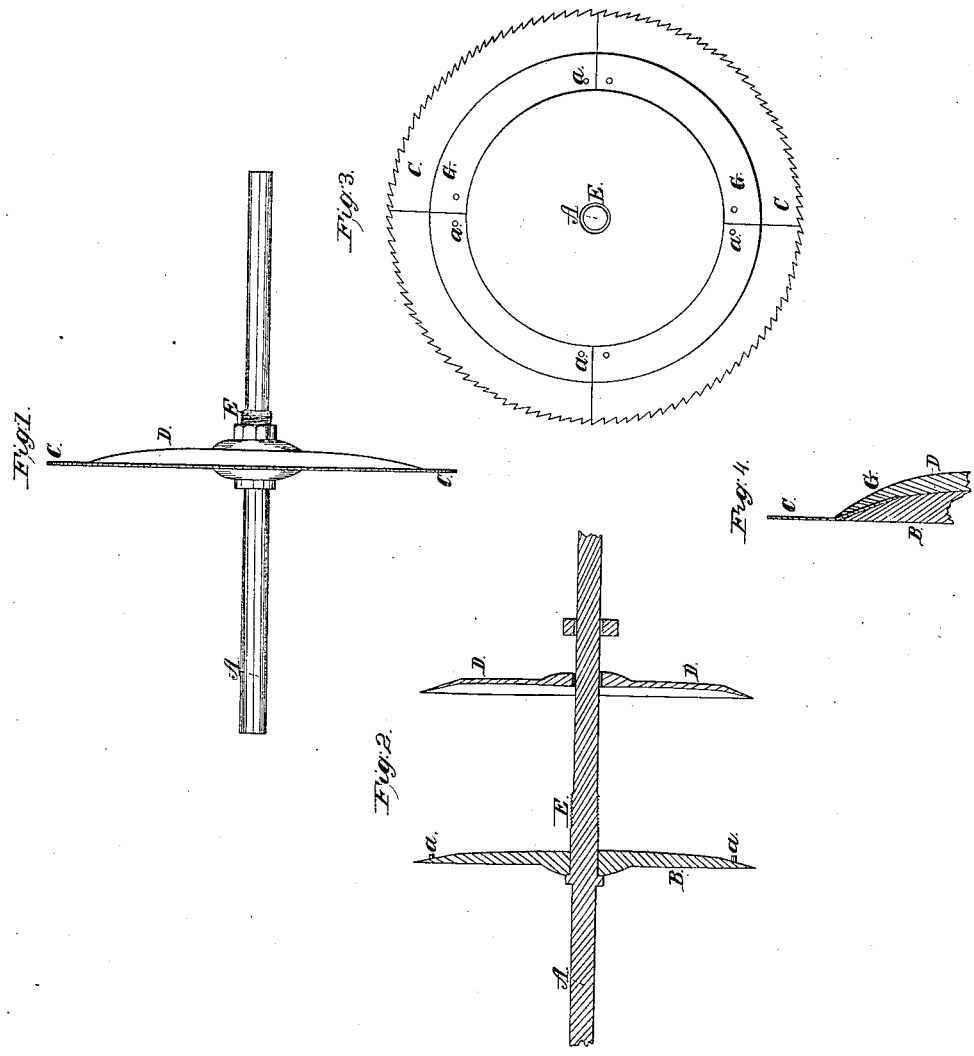
Witnesses:
Chas. F. Stansbury.
Edw. F. Brown.
Inventor:
R. K. Hawley

UNITED STATES PATENT OFFICE.

R. K. HAWLEY, OF BALTIMORE, MARYLAND.

CONSTRUCTION OF SEGMENTAL CIRCULAR SAWS.

Specification of Letters Patent No. 25,411, dated September 13, 1859.

*To all whom it may concern:*

Be it known that I, R. K. HAWLEY, of Baltimore, in the State of Maryland, have invented certain new and useful Improvements in the Circular or Veneering Saw; and I do hereby declare the following to be a full and correct description of the same, reference being had to the accompanying drawings, making part of this specification, in which—

Figure 1 is an edge view of the saw on its shaft or spindle complete; Fig. 2 is a longitudinal section through the center of the saw shaft, showing the central flange or chuck to which the saw blades are attached and the clamp plate and nut which serve to clamp the blades to the chuck; Fig. 3 is an end view, with the clamp plate removed, showing the segmental saw blades in position on the central chuck; Fig. 4 is an enlarged section of the two plates with the saw blades clamped between them, showing also the thickening of the central portion of the chuck to increase its stiffness.

The same letter marks the same part in all the figures.

The nature of my invention consists in attaching the segmental blades of the saw, to the central flange or chuck, by means of lug pins and holding the blades in position by means of a concavo-convex clamp plate placed on the saw shaft, and held up against the saw blades by means of a nut, working on a thread on the saw shaft, as shown. And my invention further consists in making segmental saw blades of an even thickness throughout and bending them so that they shall be adapted to the angle of the common bevel on the outer edges of the chuck and clamp plate, at the same time that their projecting portion shall be in the same plane with the flat surface of the central chuck—all as hereinafter more particularly described.

To understand clearly the nature and advantages of my invention it is necessary to consider the character of the circular veneer saws now in use. In order to give them the requisite stiffness, the chuck is made very thick (four or five inches) in the center, and at the periphery the saw is ground away on one side almost to a feather edge. The saw blades also have to be made very thick in order that the screws by which they are attached to the chuck may be countersunk, so as to present a flat surface on the blank side, and yet afford a strong attachment between the blades and chuck. This attachment requires that a very great number of screws be used; and great care is necessary to make them exert an equal degree of pressure on all parts of the blades, as any appreciable inequality in this respect results in a "kink" which destroys the blade. It follows that the attaching and adjusting of a set of blades in a saw of this description is a delicate and tedious operation, and that a change of blades must involve a serious loss of time. The great thickness of the central portion of the chuck, causes the veneer, as it is being sawed from the bolt, to exert a great pressure upon the conical face of the saw, producing great friction and retarding the work, or involving the necessity for extraneous contrivances (known as deflectors) to bear off the veneer from the saw, and thus, in some measure, relieve it. The friction on the deflector, however, still remains as an objectionable retarding force. The waste of material resulting from the thickness of these saws constitutes a serious economical objection to them, and their first cost is so great as to place them beyond the reach of persons of limited means. Notwithstanding all these drawbacks, the circular saw is greatly preferable to any other for veneer sawing on account of the great rapidity with which it works; and a remedy for its defects becomes therefore of great importance.

My improvements are intended to meet the objections just enumerated to the circular veneer saws now in common use; and I will now proceed to describe those improvements with reference to the accompanying drawings in which—

A marks the spindle or shaft of the saw; B, the central flange or chuck; C, the saw blades; D, the concavo-convex clamp plate; E, the screw thread on the spindle; F, the nut which holds plate D in place; G the inner part of saw blade; *a*, the lug pins.

To avoid the necessity for a thick saw blade, I attach the blades C to the chuck B by the lug pins *a*, which I call lug pins because they perform a somewhat similar office to that of the lug pins of an upright saw. These pins project from the inner face of the chuck B, and pass through the saw blades C and through the clamp plate D, and are cut off even with its outer surface. Hence there is no necessity for countersinking and blades one fourth the ordinary thickness may be used. To give stiffness to the chuck B, I make it of ¾ inch iron, attaching it to the spindle by a stout hub, and give it a bulge or increased thickness in the middle, so as to come very nearly into contact with the middle concave portion of plate D when the latter is screwed up to place. The rim of the chuck has a bevel upon its inner surface to receive the inner, conoidal part G, of the saw blade. At proper distances apart, around the face of this bevel, are placed the lug pins a, which are just long enough to pass through the saw blades, and the plate D, both of which have corresponding holes to receive them. In order to bring the flat portion, C, of the saw blades into the same plane with the flat side of the chuck B, each segment of the blade is bent (in the manner clearly shown in Fig. 4,) so that the part G between the chuck, B, and plate, D, shall correspond in form with that of their common bevel, while the outer flat part, C, or that which projects beyond B and D, shall be in the same plane with the flat side of the chuck B.

The saw is made in four or more segments as shown, and is of even thickness throughout, not requiring to be ground down as thick saws do. It receives the requisite bend and bevel at the time of its manufacture, before the temper is given. This bend of the blade adds to its stiffness in the same way that corrugation increases the stiffness of metal plates. The form or die on which the blade is bent, must correspond in shape and bevel to the thickness and size of the saw to be made.

The blades, properly prepared, are put in place on their proper lug pins; when the plate D is put on, and receives the pins a into holes prepared for that purpose. This concavo-convex plate D, has the form indicated by its name, and is made of ¼ inch iron. It has a bevel on the inside of its rim corresponding to the bevel of the conoidal part G of the saw plates, and to that on the inner rim of chuck B. It is slightly sprung in at the periphery so as to bring the outer edge of the bevel to bear first, and increase the binding and clamping effect when the nut F, is screwed up tightly against the plate. This plate D has a stout hub I through which the saw spindle passes, and against which nut F operates. Nut F, works on a screw thread E on the saw spindle, as shown, and forces the beveled surface of plate D into contact with the saw blades, clamping them firmly to the chuck. The plate D being only one third the thickness of plate B, whatever tendency to spring there may be, will be thrown upon the former. The aggregate thickness of the two plates is only one inch. Hence the deflection of the veneer on the conical face of the saw would be trifling, and the friction consequently insignificant, rendering entirely unnecessary the ordinary devices for the prevention of the heating of the blades.

Some of the advantages of this mode of making circular veneer saws may be briefly enumerated. They can be produced at a greatly diminished cost, not exceeding one third that of the saws now in use. The thinness of the blade produces a great saving of material. The diminished thickness of the chuck obviates friction and heating, and does away with the necessity for deflectors. By dispensing with screws, the operation of changing the saw blades is greatly facilitated. Instead of being as now, the work of many hours, it is accomplished in a few minutes, by simply removing nut F, and plate D, when the saws can be instantly removed and replaced by others, either when sharpening is required, or when a change in the nature of the work requires a corresponding change in the thickness of the blades or the character of the teeth. The great expense of re-setting and re-grinding the saw blades is also avoided, an entire new set of blades for my improved saw, costing less than the operation of grinding the common ones.

Having thus fully set forth the nature and advantages of my invention, what I claim therein as new and desire to secure by Letters Patent is—

A segmental veneer saw, the blades of which are formed, hung and clamped in the manner described.

The above specification of my invention signed and witnessed this fifteenth day of August A. D. 1859.

R. K. HAWLEY.

Witnesses:
   CHAS. F. STANSBURY,
   EDW. F. BROWN.